Patented June 19, 1951

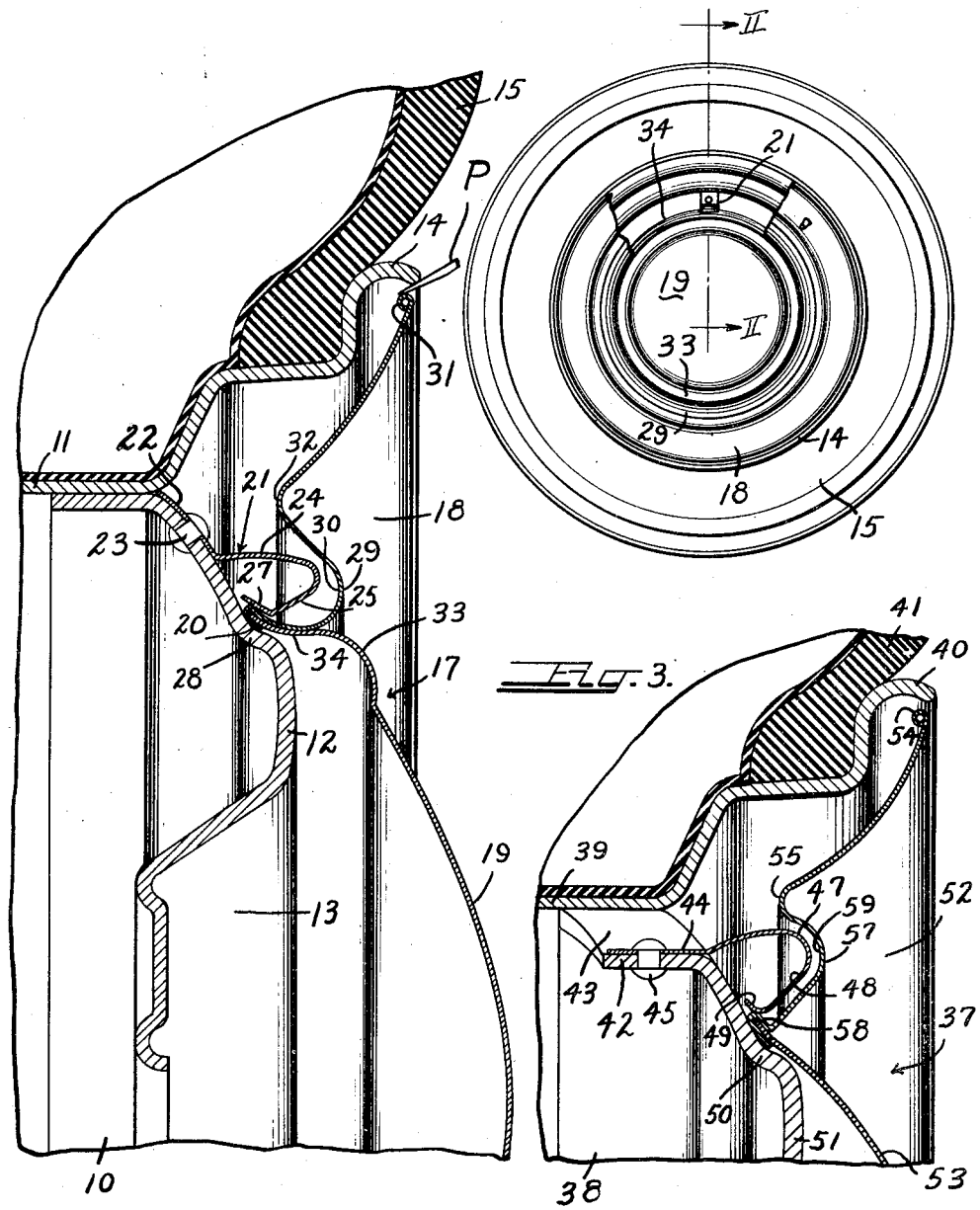

2,557,124

UNITED STATES PATENT OFFICE 2,557,124

WHEEL COVER

George Albert Lyon, Detroit, Mich.

Application February 26, 1947, Serial No. 731,030

4 Claims. (Cl. 301—37)

This invention relates to improvements in wheel structures and more particularly concerns improvements in ornamental and protective covering for the outer side of a vehicle wheel.

An important object of the present invention is to provide in a vehicle wheel structure of relatively small size an improved ornamental and protective cover arrangement which is adapted for ready snap-on, pry-off assembly with the wheel.

Another object of the invention is to provide an improved assembled relationship of a wheel and ornamental and protective cover therefor.

Another object of the invention is to provided improved cover retaining and centering means in a vehicle wheel structure.

Still another object of the invention is to provide an improved cover assembly for use with a vehicle wheel.

Yet another object of the invention is to provide an improved vehicle wheel cover which is especially adapted for use with a relatively small wheel where the operative clearances between the cover and the wheel are small.

According to the general features of the present invention, a vehicle wheel is provided with a multi-flange tire rim and a load-sustaining body part, the body part having an axially outwardly protruding annular reinforcing nose bulge formed at its radially outer side with a cover centering groove, cover retaining spring clips being mounted at the radially outer margin of the wheel body and having cover retaining shoulders working in said groove, and a wheel cover having an intermediate retaining flange seated in said groove and resiliently held therein by said clips, the cover being formed with a reinforcing rib adjacent to said flange to rigidify the cover for applying pressure and against pryoff force.

According to other general features of the invention there is provided a wheel cover having an intermediate annular inwardly axially and generally radially extending attachment flange for engagement with generally axially outwardly extending retaining clips on a wheel, the cover being formed with a reinforcing and clearance rib affording an annular axially inwardly opening channel for clearing the retaining clips when the cover is assembled with the wheel.

A further feature of the invention resides in the provision of a vehicle wheel cover including a central hub cap like portion and an annular trim ring portion having a generally axially inwardly projecting and radially extending intermediate juncture flange adapted to be engaged by a retaining clip on a wheel, that portion of the cover member opposite the flange being formed with a relatively large reinforcing rib affording a substantial clearance groove to accommodate the retaining clip while the remainder of said cover portion extends into closer proximity to the wheel.

Other objects, features and advantages of the present invention will be readily apparent from the following detailed description of certain preferred embodiments thereof, taken in conjunction with the accompanying drawings, in which:

Figure 1 is a side elevational view of a vehicle wheel including a cover embodying features of the present invention and partially broken away in order to reveal details of structure;

Figure 2 is an enlarged radial sectional view taken substantially on the line II—II of Figure 1; and Figure 3 is a sectional view on the order of Figure 2 but showing a somewhat modified form of construction.

As shown on the drawings:

A vehicle wheel with which the present invention is especially adapted to be used may be an automobile wheel including a load-sustaining body portion 10 in the form of a spider or disc formed from suitable gauge sheet metal and concentrically supporting a tire rim 11 which may be rolled from suitable gauge sheet metal. The body member 10 includes a reinforcing annular axially outwardly bulging nose portion 12 defining a central dished bolt-on flange portion 13 which is adapted to be secured to an axle part of a vehicle (not shown).

The tire rim 11 may be of the conventional multi-flanged drop-center type, including an outer terminal flange 14 and formed to receive a pneumatic tire and tube assembly 15. Between the flanges of the tire rim 11 and the outer side of the wheel and the reinforcing annular nose 12 of the wheel body exists the customary relatively deep and wide axially outwardly opening annular groove in the wheel.

Since the outer side of the wheel presents a relatively unattractive appearance and due to the various angles in the tire rim and the crevices between the tire rim and the tire flange, as well as the relatively unsightly appearance of the bolt-on flange portion 13, especially after the wheel has been bolted in place, an ornamental cover 17 is provided for substantially concealing the outer side of the wheel. This cover comprises an outer annular trim ring portion 18 which is of an extent and magnitude to substantially conceal the tire rim 11 and at least the juncture between the tire rim and the wheel body. A central circular cover portion 19 cooperates with the trim ring cover portion 18 to provide a cover unit and serves the purpose of the usual hub cap.

Although the outer and inner cover portions 18 and 19, respectively, could be made in one piece as a metal stamping, it is preferred for reasons of economy and structural efficiency to make the cover portions separately, the outer trim ring cover portion lending itself to rolling processes of manufacture while the inner hub cap cover portion 19 lends itself easily to simple die stamping.

The two portions of the cover are permanently assembled into a unit by lockseaming the inner margin of the trim ring cover member 18 about the margin of the inner hub cap cover member 19. To this end, the inner margin of the outer cover member 18 is curved generally axially inwardly and radially outwardly, as shown in Fig. 2, and is formed with an underturned generally radially inwardly extending lockseam flange 20 affording a groove within which is clamped the margin of the cover 19.

In this way, both of the cover portions may be made from the same gauge of sheet metal, or the outer trim ring cover portion 18 may be formed from a heavier metal stock, while the inner hub cap cover portion 19 may be formed from a relatively thinner metal stock, since the outer trim ring cover portion affords a support for the inner cover portion 19 and also serves as a protective reinforcement for the margin of the inner cover portion. Once assembled, the separate portions of the cover are substantially merged into a unitary cover.

The relative proportions of the cover portions 18 and 19 are such that the hub cap cover portion 19 extends to the radially outer side of the reinforcing bulge 12 of the wheel body, and the juncture of the cover portions affords a convenient, strong, multi-layer flange for engaging the wheel body.

Resilient retaining clips 21 which may be in any suitable number are carried in an equally spaced annular series by the wheel body and are adapted to engage the juncture flange of the cover hub portion in snap-on pry-off relationship. For this purpose, each of the clips 21 is formed with a base portion 22 which is adapted to engage endwise at the juncture of the tire rim and wheel body and is secured as by means of a rivet 23 to the wheel body, being thus held against swiveling out of operative position.

From the base portions 22, the clips extend goose-neck fashion, having a generally axially outwardly extending body portion 24 which merges on a rounded juncture with a generally axially and radially inwardly extending cam flange 25 terminating in a retaining shoulder flange 27 extending generally axially inwardly and radially outwardly. The clips 21 are of substantial size both as to width and extent so as to afford relatively large resilient areas for the body and cam flange portions 24 and 25 so that the clips may yield amply for the snapping-on and prying-off of the cover without danger of overstressing the same.

The disposition of the retaining clips 21 is such that the retaining shoulder flanges 27 thereof will engage in front of and hold the juncture flange of the cover tightly against the wheel body 10, and more particularly within a groove 28 formed in the radially outer side of the reinforcing hump 12. Thus, the cover 17 is adapted to be applied to the wheel by moving it axially inwardly against the cam flanges 25 of the retaining clips and applying inward pressure against the cover until the juncture flange has passed the cam flanges 25 by flexure of the clip bodies 24 and the cam flanges 25, whereupon the shoulder flanges 27 snap past the juncture flange and yieldably press the latter into the groove 28. An advantage of the groove 28 resides in retaining the cover concentric with the wheel.

In order to permit the outer trim ring cover portion 18 to lie relatively close to the tire rim 11, and yet afford ample clearance for the retaining clips 21, and also to reinforce the inner marginal portion of the trim ring cover portion, the latter is formed with a relatively large reinforcing rib 29 closely adjacent to and preferably contiguous the adjacent margin of the inner hub cap cover member 19. Thereby a relatively large annular clearance groove 30 opening generally axially inwardly is afforded. The internal cross-sectional dimension of the groove is such as to clear the clips 21 in all operational conditions of the clips. That is, ample space is afforded for resilient rocking of the clips in the mounting or removal of the cover.

The trim ring cover portion 18 is preferably formed of a generally convex cross-sectional form so as to simulate generally the curvature of the tire side wall and when colored white thus affords the impression of an inner white side wall extension of a relatively massive tire.

At its outer margin the cover portion 18 is preferably formed with an inwardly curled reinforcing bead 31 which is adapted to clear the tire rim terminal flange 14 at the radially inner side thereof and with the maximum axially outward extent of the cover margin protected from curbing or like damage by the protruding edge of the tire rim flange 14. When it is desired to remove the cover 17, a pry-off tool generally indicated at T, is inserted between the tire rim flange 14 and the outer marginal reinforcing bead 31 of the cover and manipulated to pry the cover axially outwardly free from the retaining clips 21.

At the juncture of the reinforcing rib 29 and the remainder of the body of the cover portion 18, a generally axially inwardly extending rib 32 is formed, which, together with the rib 29, affords a strong reinforcement which will resist bending or adverse deformation of the trim ring cover portion 18 when the cover is pried free from the wheel. The reinforcing rib 29 also affords a strong reinforcement to withstand the pressure exerted against the cover in applying it to the wheel as required to snap the juncture flange past the retaining clips 21.

For purpose of symmetry in appearance and also to afford reinforcement for the marginal portion of the inner cover member 19 adjacent to the outer cover portion rib 29, an annular rib 33 of attractive curvature, generally simulating the bead 29, is formed in the marginal portion of the inner cover member whereby the juncture of the two portions of the cover gives the general impression of a corrugated intermediate area for the cover unit.

Axially inwardly from the bead 33, the margin of the cover portion 19 is preferably formed with a concave curvature 34 complementary to the radial inner curvature of the outer cover portion bead 29. This facilitates initial internested assembly of the cover portions and forms a double thickness reinforcement for the juncture of the two portions of the cover which is additionally reinforced, of course, by the turned-back clenching flange 20 at the extremity of the juncture flange structure. This strong reinforcement at the juncture of the cover portions is highly advantageous in preventing damage to the juncture flange portion and thereby assuring that it will remain concentric and thus at all times seat uniformly in the centering groove 28 of the wheel body.

The modified construction shown in Figure 3 is substantially the same as the structure already described but differs therefrom in certain respects having to do primarily with mounting of the retaining clips and with the reinforcing bead structure of the cover.

In this modified form of the invention, a cover 37 is applied to a wheel including a body portion 38 and a tire rim 39, the latter having a terminal flange 40 and formed to receive a pneumatic tire and tube assembly 41.

The wheel body 38 is formed with a plurality of marginal insets 42, affording ventilation openings 43 at the juncture of the wheel body with the tire rim. The cover retaining clips 44 are secured as by means of rivets 45 to the insets 42. The clips 44 extend axially outwardly from the openings 43 to provide resilient relatively large goose-neck retaining portions 47 each formed with an axially and radially inwardly oblique cam flange portion 48 and an axially inwardly, radially outwardly angled retaining shoulder portion 49, the latter being operatively disposed with respect to a cover centering groove 50 in the radially outer side of a reinforcing nose bulge 51 in the wheel body.

The cover 37 comprises an annular outer trim ring portion 52 and an inner annular hub cap portion 53. The trim ring portion 52 is formed with an outer marginal reinforcing bead 54 and extends on a curved cross-sectional contour, generally simulating the tire side wall curvature, radially and axially inwardly to a generally axially inwardly extending annular reinforcing rib 55. This rib 55 forms a juncture with a generally axially outwardly extending inner marginal reinforcing and clip clearance rib 57 of generous curvature and extending at its inner side generally radially and axially inwardly to an axially inwardly and radially outwardly extending flange 58 bent under upon itself to provide a groove within which the edge of the central hub cap portion 53 is clamped in unitary assembly with the outer cover portion 52. The juncture thus afforded provides a triple thickness reinforced and generally axially inwardly and radially outwardly extending flange which seats in the juncture groove 50 of the wheel body and is engaged retainingly by the clips 44. Within the inner marginal rib 57 of the outer trim ring cover portion 52 is afforded a relatively large axially inwardly opening annular groove 59 receptive of the heads of the several retaining clips 44.

Similarly as in the previously described form of the cover, the rib 57 affords substantial reinforcement for the outer cover portion not only for receiving the inward pressure in applying the cover, but also to prevent the cover from the undue stress and damage when the cover is pried free from the wheel.

The cover, according to the present invention, is especially suitable for relatively small wheels wherein the relatively small clearances present a substantial problem in applying an ornamental and protective cover to the wheel. By the present invention this problem is substantially met in a simple manner and at low cost.

By having the outer margin of the cover free from the terminal flange of the tire rim and disposed axially inwardly of said flange, not only is the cover rendered independent of axial variations of the assembly of the tire rim and wheel body, but the trim ring portion of the cover is protected against damage from running of the wheel against a curb or the like.

I claim as my invention:

1. In a vehicle wheel structure including a multi-flange tire rim and a load-sustaining body part, the body part having an axially outwardly protruding annular reinforcing nose bulge formed at its radially outer side with a cover centering groove, cover retaining spring clips mounted at the radially outer margin of the wheel body and having cover retaining shoulders working in said groove, and a wheel cover having an intermediate generally radially outwardly extending retaining flange seated in said groove and resiliently held therein by said clips, the cover being formed with a reinforcing rib adjacent to said flange to rigidify the cover for applying pressure and against pry-off force.

2. In combination in a vehicle wheel structure, a tire rim, a disk-type of load sustaining body part, said body part having an intermediate annular nose bulge defining a central bolt-on flange, said nose bulge having an axially inset groove facing generally axially and radially outwardly at the radially outer side of the nose bulge, cover retaining spring clips on the margin of the wheel body intervening between said groove and the tire rim, and a cover closing the outer side of the wheel assembly and including a trim ring and a central cover portion, the trim ring being of a magnitude and extent to substantially cover the tire rim and the portion of the wheel body radially outwardly of the nose bulge and the central cover portion covering the remainder of the wheel, the trim ring having a strongly reinforced radially outer margin disposed adjacent to the extremity of the tire rim and adapted for engagement by a pry-off tool for removing the cover from the wheel, the trim ring extending from the reinforced radially outer margin generally radially and axially inwardly to a point adjacent to the radially outer side of the spring clips and thence generally radially inwardly and axially outwardly whereby to provide an axially inwardly extending reinforcing annular rib spaced from the juncture of the tire rim and the wheel body, the radially inner portion of the trim ring curving generally radially inwardly and then axially inwardly and providing a generally axially outwardly extending annular reinforcing rib supplementary to the first mentioned reinforcing rib and according a generally undulant cross section to the radially inner portion of the trim ring as well as affording an axially inwardly opening annular groove to provide clearance for the retaining clips, the radially innermost extremity of the trim ring extending generally radially outwardly and being turned under and radially inwardly upon itself into a generally radially inwardly opening groove within which the margin of the inner cover member is clampingly secured and affording a further reinforcement for the trim ring as well as a generally radially outwardly extending multi-thickness flange engaged by the clips to retain the cover on the wheel, the adjacent marginal portion of the inner cover member extending generally radially inwardly and axially outwardly to clear the nose bulge of the wheel body, said multi-thickness flange being of a diameter and formation at its radially inner side to fit closely within said groove in the wheel body for centering the cover in its clip-retained position on the wheel.

3. As an article of manufacture, a vehicle wheel cover for a wheel having tire rim and body portions, the cover including a trim ring portion and a circular inner cover portion, the trim ring portion extending generally radially and axially inwardly and having an inner marginal portion diverging from the radially outer portion of the trim ring generally radially inwardly and axially outwardly from a rib-like juncture and then at its radially inner portion curving generally radially inwardly and axially inwardly and finally generally radially outwardly and then being turned under and radially inwardly whereby there is provided in radially inward succession a generally axially inwardly extending annular reinforcing rib, then a generally axially outwardly extending reinforcing rib, with said ribs defining a generally radially inward undulant cross section for the trim ring portion, and finally a generally radially inwardly opening groove within which the radially outer edge of the inner cover portion is retainingly interengaged with the trim ring portion and clamped securely in assembly with the trim ring portion, the cover portions thereby providing a unitary strongly reinforced cover assembly wherein the trim ring cover portion is rigidly reinforced to withstand pry-off, snap-on assembly with the wheel and with retaining clips on the wheel engaging the multi-thickness flange at the juncture of the cover portions and with the clips accommodated within the groove opening generally axially inwardly in the radially innermost of the undulant reinforcing ribs of the trim ring.

4. In a vehicle wheel structure including a multi-flange tire rim and a load-sustaining body apart, the body part having an axially outwardly protruding annular reinforcing nose bulge formed at its radially outer side with a cover centering groove, cover retaining spring clips mounted at the radially outer margin of the wheel body and having cover retaining shoulders working in said groove, and a wheel cover having an intermediate generally radially outwardly extending retaining flange seated in said groove and resiliently held therein by said clips.

GEORGE ALBERT LYON.

REFERENCES CITED

The following references are of record in the file of this patent:

UNITED STATES PATENTS

| Number | Name | Date |
|---|---|---|
| Re. 22,119 | Lyon | June 16, 1942 |
| D. 141,288 | Lyon | May 22, 1945 |
| 2,190,669 | Lyon | Feb. 20, 1940 |
| 2,239,367 | Lyon | Apr. 22, 1941 |
| 2,239,898 | Lyon | Apr. 29, 1941 |
| 2,317,393 | Lyon | Apr. 27, 1943 |
| 2,368,243 | Lyon | Jan. 30, 1945 |
| 2,386,241 | Lyon | Oct. 9, 1945 |